(12) United States Patent
Koh et al.

(10) Patent No.: US 11,494,431 B2
(45) Date of Patent: Nov. 8, 2022

(54) GENERATING ACCURATE AND NATURAL CAPTIONS FOR FIGURES

(71) Applicant: Adobe Inc., San Jose, CA (US)

(72) Inventors: Eunyee Koh, San Jose, CA (US); Xin Qian, Greenbelt, MD (US); Sungchul Kim, San Jose, CA (US); Sana Malik Lee, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 420 days.

(21) Appl. No.: 16/804,750

(22) Filed: Feb. 28, 2020

(65) Prior Publication Data
US 2021/0271705 A1    Sep. 2, 2021

(51) Int. Cl.
| | |
|---|---|
| *G06F 16/583* | (2019.01) |
| *G06F 40/169* | (2020.01) |
| *G06F 17/16* | (2006.01) |
| *G06N 3/04* | (2006.01) |
| *G06N 3/08* | (2006.01) |
| *G06F 40/44* | (2020.01) |
| *G06F 40/56* | (2020.01) |
| *G06F 17/00* | (2019.01) |

(52) U.S. Cl.
CPC ............ *G06F 16/583* (2019.01); *G06F 17/16* (2013.01); *G06F 40/169* (2020.01); *G06N 3/0472* (2013.01); *G06N 3/08* (2013.01); *G06F 16/5846* (2019.01); *G06F 40/44* (2020.01); *G06F 40/56* (2020.01); *G06N 3/0445* (2013.01); *G06N 3/0454* (2013.01)

(58) Field of Classification Search
CPC ...... G06F 16/583; G06F 17/16; G06F 40/169; G06F 16/5846; G06F 40/44; G06F 40/56; G06N 3/0472; G06N 3/08; G06N 3/0445; G06N 3/0454
See application file for complete search history.

(56) References Cited

U.S. PATENT DOCUMENTS

2021/0201044 A1*  7/2021 Herdade ............. G06N 3/0454

OTHER PUBLICATIONS

Yuqing Peng et al., "Image and Vision Computing" https://doi.org/10.1016/j.imavis.2019.03.003 0262-8856/© 2019 Elsevier B.V. All rights reserved. pp. 38-44 (Year: 2019).*
Charles Chen et al., "Neural Caption Generation over Figures" 2019 Association for Computing Machinery . . . pp. 482-785 (Year: 2019).*
Mathews, Alexander Patrick, et al., "Senticap: Generating image descriptions with sentiments." In AAAI '16, 2016, 7 pages.
Anderson, Peter, et al., "Bottom-up and top-down attention for image captioning and visual question answering." Proceedings of the IEEE conference on computer vision and pattern recognition 2018, pp. 6077-6086.

(Continued)

*Primary Examiner* — Quoc A Tran
(74) *Attorney, Agent, or Firm* — F. Chau & Associates, LLC

(57) ABSTRACT

Techniques of captioning for figures includes generating a caption unit for a figure by defining a finite set of caption types. From each caption type, additional input for that caption type, as well as figure image data and figure metadata, an automated system may generate a respective caption unit, each caption unit including a sequence of words. Further, the generated caption for a figure includes a combination of the generated caption units.

20 Claims, 6 Drawing Sheets

(56) References Cited

OTHER PUBLICATIONS

Aoki, K., & Kobayashi, I., "Linguistic summarization using a weighted n-gram language model based on the similarity of time-series data." In 2016 IEEE International Conference on Fuzzy Systems (FUZZ-IEEE), Jul. 2016, pp. 595-601.
Artstein, Ron, and Massimo Poesio., "Inter-coder agreement for computational linguistics." Computational Linguistics 34:4, 2008, pp. 555-596.
Bigham, Jeffrey P., et al., "An Uninteresting Tour Through Why Our Research Papers Aren't Accessible." Proceedings of the 2016 CHI Conference Extended Abstracts on Human Factors in Computing Systems, 2016, pp. 621-631.
Biten, Ali Furkan, et al., "Good News, Everyone! Context driven entity-aware captioning for news images." Proceedings of the IEEE Conference on Computer Vision and Pattern Recognition, 2019, pp. 12466-12475.
Bloom, Benjamin S., "Taxonomy of educational objectives. vol. 1: Cognitive domain." New York: McKay, 1956, pp. 20-24.
Brady, Erin, et al., "Creating accessible PDFs for conference proceedings." In Proceedings of the 12th Web for All Conference, May 18, 2015, pp. 1-4.
Carletta, Jean, et al., "The reliability of a dialogue structure coding scheme." Computational Linguistics 23:1, 1997, pp. 13-31.
Chaudhry, Ritwick et al., "LEAF-QA: Locate, Encode & Attend for Figure Question Answering", arXiv 1907.12861v1, Jul. 30, 2019, 10 pages.
Chen, Charles, et al., "Figure Captioning with Reasoning and Sequence-Level Training." arXiv:1906.02850, Jun. 7, 2019, 11 pages.
Corio, M., & Lapalme, G., "Generation of texts for information graphics." In Proceedings of the 7th European Workshop on Natural Language Generation EWNLG'99 , May 1999, pp. 49-58.
Cornia, M., et al., "Show, control and tell: a framework for generating controllable and grounded captions." In Proceedings of the IEEE Conference on Computer Vision and Pattern Recognition, 2019, pp. 8307-8316.
Daniel Chester and Stephanie Elzer, "Getting computers to see information graphics so users do not have to." In International Symposium on Methodologies for Intelligent Systems. Springer, 2005, pp. 660-668.
David Grangier and Michael Auli, "QuickEdit: Editing Text & Translations by Crossing Words Out." In NAACL HLT 2018, pp. 272-282.
Demir, Seniz, et al., "Generating textual summaries of bar charts." Proceedings of the Fifth International Natural Language Generation Conference Association for Computational Linguistics, 2008, 9 pages.
Elzer, Stephanie, et al., "The automated understanding of simple bar charts." Artificial Intelligence 175.2, 2011, pp. 526-555.
Fasciano, Massimo, and Guy Lapalme, "Postgraphe: a system for the generation of statistical graphics and text." Eighth International Natural Language Generation Workshop, 1996, pp. 51-60.
Gan, C., et al., "Stylenet: Generating attractive visual captions with styles." In Proceedings of the IEEE Conference on Computer Vision and Pattern Recognition, 2017, pp. 3137-3146.
Gu, J., et al., "Incorporating Copying Mechanism in Sequence-to-Sequence Learning." In Proceedings of the 54th Annual Meeting of the Association for Computational Linguistics (vol. 1: Long Papers), 2016, pp. 1631-1640.
Hancock, B., et al., "May. Generating titles for web tables." In The World Wide Web Conference, 2019, pp. 638-647.
Honnibal, Matthew, and Mark Johnson, "An improved non-monotonic transition system for dependency parsing." Proceedings of the 2015 conference on empirical methods in natural language processing, 2015, pp. 1373-1378.
Jessen, Morten, et al., "Text Localization in Scientific Figures using Fully Convolutional Neural Networks on Limited Training Data." In Proceedings of the ACM Symposium on Document Engineering 2019, pp. 1-10.
Jiasen, Lu, et al., "Knowing When to Look: Adaptive Attention via a Visual Sentinel for Image Captioning." In CVPR 17, 2017, pp. 375-383.
Johnson, Justin, et al., "Densecap: Fully convolutional localization networks for dense captioning." Proceedings of the IEEE Conference on Computer Vision and Pattern Recognition, 2016, pp. 4565-4574.
Johnson, Justin, et al., "Clevr: A diagnostic dataset for compositional language and elementary visual reasoning." Proceedings of the IEEE Conference on Computer Vision and Pattern Recognition. 2017, pp. 2901-2910.
Jorge Poco and Jeffrey Heer, "Reverse-Engineering Visualizations: Recovering Visual Encodings from Chart Images." EuroVis '17, 2017, 3 pages.
Kafle, Kushal, et al., "DVQA: Understanding data visualizations via question answering." Proceedings of the IEEE Conference on Computer Vision and Pattern Recognition, 2018, pp. 5648-5656.
Kahou, Samira Ebrahimi, et al., "Figureqa: An annotated figure dataset for visual reasoning." arXiv:1710.07300, Feb. 22, 2018, 20 pages.
Karpathy, A., and Fei-Fei, L., "Deep visual-semantic alignments for generating image descriptions." In Proceedings of the IEEE conference on computer vision and pattern recognition, 2015, pp. 3128-3137.
Kim, Dong-Jin, et al., "Dense relational captioning: Triple-stream networks for relationship-based captioning." Proceedings of the IEEE Conference on Computer Vision and Pattern Recognition 2019, pp. 6271-6280.
Krause, Jonathan, et al., "A hierarchical approach for generating descriptive image paragraphs." Proceedings of the IEEE conference on computer vision and pattern recognition. 2017, pp. 317-325.
Krishna, Ranjay, et al., "Visual genome: Connecting language and vision using crowdsourced dense image annotations." International Journal of Computer Vision 123:1, 2017, 32-73.
Lei, et al., "Sequicity: Simplifying task-oriented dialogue systems with single sequence-to-sequence architectures." In Proceedings of the 56th Annual Meeting of the Association for Computational Linguistics, vol. 1: Long Papers, Jul. 2018, pp. 1437-1447.
Malinowski, Mateusz, et al., "A multi-world approach to question answering about real-world scenes based on uncertain input." In NIPS '14, 2014, 9 pages.
McCoy, Kathleen F., et al., "Towards generating textual summaries of graphs." HCI, 2001, 5 pages.
Mittal, Vibhu O., et al., "Describing complex charts in natural language: A caption generation system." Computational Linguistics 24.3, 1998), pp. 431-467.
Nayak, Neha, et al., "To Plan or not to Plan? Discourse Planning in Slot-Value Informed Sequence to Sequence Models for Language Generation." Proc. Interspeech , 2017, pp. 3339-3343.
Papineni, Kishore, et al., "BLEU: a method for automatic evaluation of machine translation." Proceedings of the 40th annual meeting on association for computational linguistics. Association for Computational Linguistics, 2002, 8 pages.
Moraes, Priscilla, et al., "Generating summaries of line graphs." In Proceedings of the 8th International Natural Language Generation Conference (INLG '14), 2014, pp. 95-98.
Rabah, A. Al-Zaidy, et al., "Automatic summary generation for scientific data charts." In Workshops at AAAI '16, 2016, pp. 658-663.
Roth, Steven F. et al., "Interactive Graphic Design Using Automatic Presentation Knowledge." In CHI '94, 1994, 7 pages.
Santoro, Adam et al., "A simple neural network module for relational reasoning." In NIPS '17, 2017, 10 pages.
See, A., et al. "Get To The Point: Summarization with Pointer-Generator Networks." In Proceedings of the 55th Annual Meeting of the Association for Computational Linguistics (vol. 1: Long Papers), Jul. 2017, pp. 1073-1083.
Shuster, Kurt, et al., "Engaging image captioning via personality." Proceedings of the IEEE Conference on Computer Vision and Pattern Recognition, 2019, 11 pages.
Siegel, Noah, et al., "FigureSeer: Parsing result-figures in research papers." European Conference on Computer Vision. Springer, Cham, 2016, 16 pages.

(56) References Cited

OTHER PUBLICATIONS

Stanislaw Antol, et al., "VQA: Visual Question Answering." International Journal of Computer Vision 1:123, 2016, pp. 4-31.

Vinyals, Oriol, et al., "Show and Tell: A Neural Image Caption Generator." arXiv:1411.4555v2, Apr. 20, 2015, 9 pages.

W3C 2016. Applying text alternatives to images with the Alt entry in PDF documents, retrieved from https://www.w3.org/TR/WCAG20-TECHS/pdf#PDF1, 2016, 189 pages.

W3C 2019. A First Review of Web Accessibility, retrieved from . https://www.w3.org/WAI/testevaluate/preliminary/#images, 2019, 23 pages.

Chen, C, et al., "Neural caption generation over figures." In Adjunct Proceedings of the 2019 ACM International Joint Conference on Pervasive and Ubiquitous Computing and Proceedings of the 2019 ACM International Symposium on Wearable Computers, 2019, pp. 482-485.

Wen, Tsung-Hsien, et al., "Semantically Conditioned LSTM-based Natural Language Generation for Spoken Dialogue Systems." In EMNLP '15, 2015, 11 pages.

Xu, Kelvin, et al. "Show, attend and tell: Neural image caption generation with visual attention." International conference on machine learning., 2015, 10 pages.

Yang, Zichao, et al. "Stacked attention networks for image question answering." Proceedings of the IEEE conference on computer vision and pattern recognition, 2016, 9 pages.

Yao, Ting, et al. "Boosting image captioning with attributes." Proceedings of the IEEE International Conference on Computer Vision, 2017, 9 pages.

Yi, Kexin, et al. "Neural-symbolic vqa: Disentangling reasoning from vision and language understanding." Advances in Neural Information Processing Systems, 2018, 12 pages.

Yin, Guojun, et al. "Context and attribute grounded dense captioning." Proceedings of the IEEE Conference on Computer Vision and Pattern Recognition, 2019, 10 pages.

Zheng, Yue, Yali Li, and Shengjin Wang. "Intention Oriented Image Captions with Guiding Objects." Proceedings of the IEEE Conference on Computer Vision and Pattern Recognition, 2019, 10 pages.

Elzer, Stephanie, et al., "Exploring and exploiting the limited utility of captions in recognizing intention in information graphics." Proceedings of the 43rd Annual Meeting on Association for Computational Linguistics. Association for Computational Linguistics, 2005, pp. 223-230.

\* cited by examiner

| Caption Type | Description | Additional Input | Example Output with slot value |
|---|---|---|---|
| Title | Mentioning the title, with paraphrasing (in some implementations) | None | This table shows sales statistics for items in different stores. |
| Figure Type | Horizontal/vertical bar; pie; line; etc | None | This is a horizontal bar chart. |
| Count | Number of elements in figure | None | There are three bars in the chart. |
| Label Name | Description of text label name from ordered position | Ordinal number Nth | Cage is the label fo the first bar from the bottom. |
| Min/Max | Description of element with min/max value | None | Frame has the highest accuracy. |
| Comparison | Description of advantage of one element over another | Element X, Y | The accuracy of the algorithm damage is larger than ward. |
| Value | Description of value of element | Element X | 80 is the accuracy of the algorithm brace. |

| Source | sales statistics for items in different stores |
| Target 1 | sales statistics for items in each retail location |
| Target 2 | sales statistics for cokes in each CVS Pharmacy |
| Source | most preferred objects |
| Target 1 | the most favorable objects |
| Target 2 | the highest ranked video games |
| Source | The chart shows (.*) ([0-9]{4}) import |
| Target | The chart reports import statistics for \\1 import in \\2 |
| Source | The chart shows (.*) over Product_Code |
| Target 1 | The chart shows product wise \\1 |
| Target 2 | The chart shows \\1 over chocolate |

GENERATING ACCURATE AND NATURAL CAPTIONS FOR FIGURES

TECHNICAL FIELD

This description relates to the automatic generation of figure captions.

BACKGROUND

Scientific-style figures are media forms in formats such as HTML and PDF to present numerical information. Captions are pieces of text accompanied with figures that summarize their information. Accurate, natural language captions for figures may improve the accessibility of the figure and the web page. For example, accurate, natural language captions can scaffold alternative text for figures to increase accessibility for visually impaired users, and users with low network bandwidth for loading figures. Such captions may also help busy users quickly grasp the main ideas of a web page during skim reading. A detailed caption may also increase the retrievability of a web page by search engine crawlers.

Nevertheless, descriptions for figures on web pages are often trivial or non-informative or absent altogether. In contrast, an automated figure captioning system could provide much value being integrated into existing web publishing tools such as Adobe Acrobat.

To automatically generate captions for figures, an application may parse figure elements, reason over the relationships between elements, and describe the relationships in natural language. Recent advances in more general vision-language problems such as visual question answering and image captioning demonstrate an automated description about an image. Conventional approaches to captioning for figures include the question answering and figure element extraction used for generic images.

Nevertheless, in the conventional approaches to captioning for figures, it is unclear how the outputs of these conventional approaches provide accessibility to a user. For example, in performing figure question answering, one assumes that users generate questions about a figure, but visually impaired users, who may struggle to see the figure, may not be able to ask questions. Moreover, in performing figure element extraction, there was no study concerning how users may interpret parsed figure elements to understand the figure. Finally, the captions that do get generated are frequently inaccurate or, even if accurate, composed of unnatural language.

SUMMARY

In one general aspect, a method can include receiving figure image data, the figure image data representing a figure, the figure having a set of components. The method can also include generating figure metadata from the figure image data, the figure metadata including numerical and textual values describing the set of components of the figure. The method can further include, for each of a set of caption types, each of the set of caption types indicating a respective component of the set of components of the figure, generating a caption unit of a set of caption units based on the figure image data, the figure metadata, and that caption type, each of the set of caption units corresponding to a respective component of the set of components and including a sequence of words describing that component. The method can further include combining the set of caption units to form a caption associated with the figure.

The details of one or more implementations are set forth in the accompanying drawings and the description below. Other features will be apparent from the description and drawings, and from the claims.

BRIEF DESCRIPTION OF THE DRAWINGS

FIG. 3 is a diagram illustrating an example set of caption types.

FIG. 5 is a diagram illustrating example post-editing rules.

DETAILED DESCRIPTION

Figure 1:
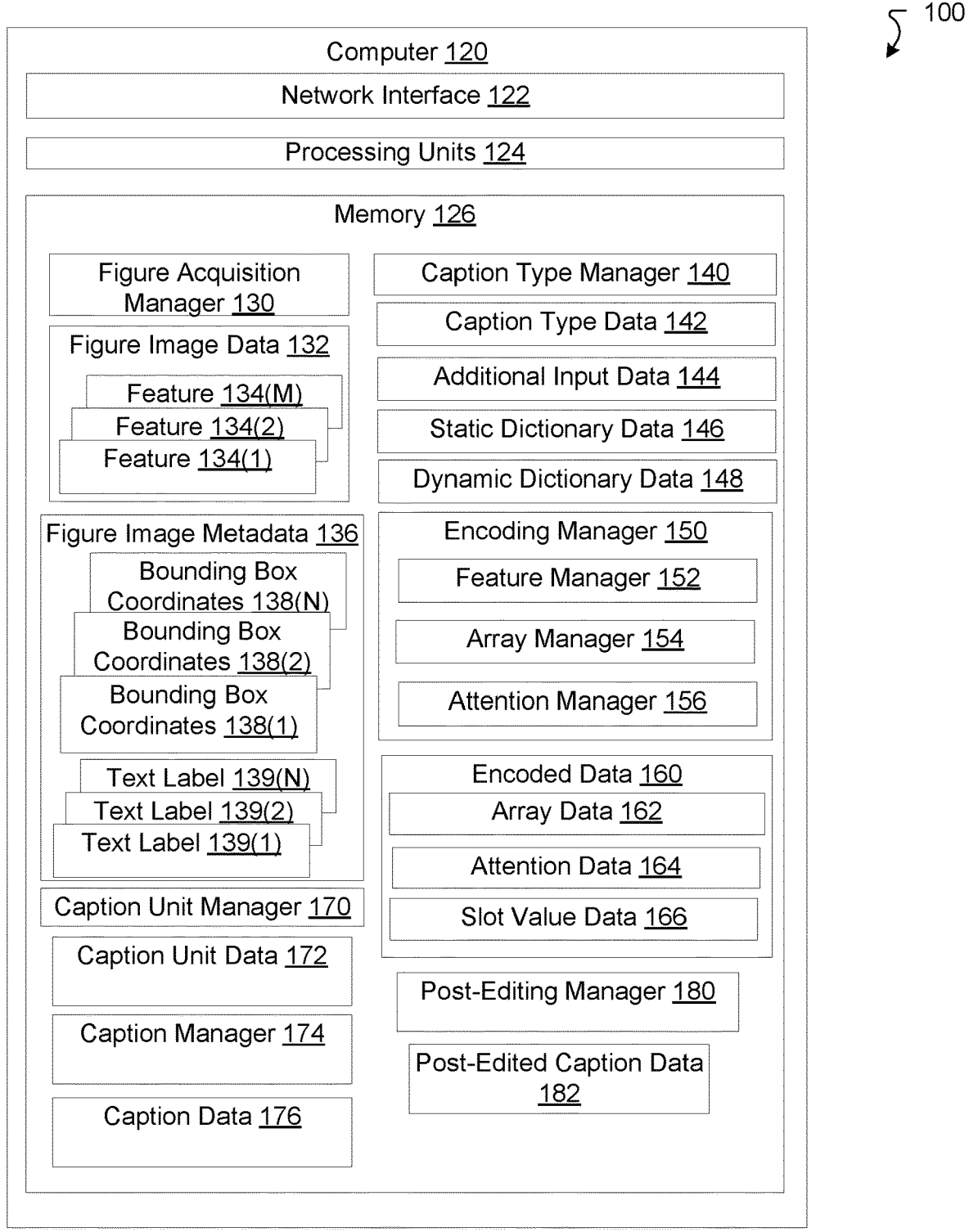
FIG. 1 is a diagram illustrating an example electronic environment in which improved techniques described herein may be implemented.

In contrast to the above-described conventional approaches to captioning for figures, an improved technique includes generating a caption for a figure by defining a finite set of caption types. From each caption type, as well as figure image data and figure metadata, an automated system may generate a respective caption unit, each caption unit including a sequence of words. The generated caption for a figure includes a combination of the generated multi-word caption units.

The above-described improved technique uses minimal input from users; accordingly, such techniques improve user accessibility for those users with visual impairment or on slow networks. In some implementations, there is an additional post-editing process used after the generated caption units have been generated and combined to form the caption. Moreover, as validated with post-editing results, the improved techniques may be used to train from a realistic corpus to generate captions that are more natural sounding than those generated according to the conventional approaches. In some implementations, without a parallel corpus between figures and post-edited caption units, the post-editing process is validated through a pseudo parallel corpus based on rules derived from datasets.

In some implementations, generating a caption unit includes performing an encoding operation on the figure image data, the figure metadata, and the caption type data to produce a decoder initialization array. The decoder initialization array is a data structure that includes a caption type vector representing the caption type and an embedding of a slot value word. Generating the caption unit in this implementation also includes initializing a decoder with the decoder initialization array. Here, the decoder is configured to predict the sequence of words of the caption unit. In such implementations, performing the encoding operation includes obtaining the set of features of the figure image based on the figure image data. Here, the set of figures is obtained using a neural network. In this implementation, performing the encoding operation also includes generating an encoded input structure based on the bounding box coordinates, the encoded input structure includes an array of input sequences (i.e., a matrix). Here, each element of the array of input sequences corresponds to a respective bounding box. Performing the encoding operation may further include generating, from the encoded input structure and the caption type data, a set of attention weights. Each of the set of attention weights corresponds to a bounding box of the set of bounding boxes and representing a likelihood of the bounding box being associated with a slot value word. Performing the encoding operation may further include obtaining a slot value classification result based on the set of attention weights.

In the implementations described above, the metadata may also include a set of text labels, each of the set of text labels corresponding to a respective bounding box, wherein each array of input sequences of the encoded input structure corresponding to a respective bounding box of the set of bounding boxes includes the bounding box coordinates of the bounding box, an index indicative of the text label corresponding to the bounding box, and a binary value indicating whether the text label corresponding to the bounding box has digits only.

In the implementations described above, the caption type data indicates that the caption type may be a label name describing a name of a text label corresponding to a bounding box of the set of bounding boxes and its position relative to a fixed location. In such implementations, generating the set of attention weights includes forming a query vector based on the position of the text labels corresponding to each of the set of bounding boxes; for each of the set of bounding boxes, generating a raw weight based on the array of input sequences corresponding to that bounding box and the query vector to produce a set of raw weights; and performing a normalization operation on the set of raw weights to produce the set of attention weights, a sum of the attention weights of the set of attention weights being unity. In some further implementations, generating the raw weight for each of the set of bounding boxes includes multiplying the array of input sequences corresponding to that bounding box by a first fixed array to produce a first vector; multiplying the query vector by a second fixed array to produce a second vector; and applying a sigmoidal function to a sum of the first vector and the second vector. An example of such a sigmoidal function is a hyperbolic tangent.

In the implementations described above, obtaining the slot value classification result based on the set of attention weights may include performing a classification operation on the set of attention weights and the figure image features to produce a slot value word. In this case, the classification operation is configured to predict, as the slot value word, a dictionary word among a static dictionary and a dynamic dictionary, the slot value word being used to initialize the decoder.

In some implementations, the method also includes generating a second caption unit based on the figure image data, the figure metadata, and the caption type data, the second caption unit including a second sequence of words to be included in the caption associated with the figure. In such implementations, a concatenation operation is performed on the caption unit and the second caption unit to produce the caption associated with the figure.

As used herein, figure image represents an image containing elements such as bars and text labels that are used to communicate a quantitative result. Figure metadata represents information in the figure image not necessarily visible to a reader, such as bounding box coordinates. A caption type is an indicator of an aspect of the figure image being described, e.g., a title, an indicator of the type of figure (e.g., horizontal/vertical bars, pie). A caption unit is a sequence of words that describes an aspect of the figure image, derived from a caption type. A figure caption includes one or more caption units joined together to provide a description of the figure image to a reader.

FIG. 1 is a diagram that illustrates an example electronic environment 100 in which the above-described improved techniques may be implemented. As shown, in FIG. 1, the electronic environment 100 includes a computer 120.

The computer 120 is configured to display user-specified drawings on a display device. The computer 120 includes a network interface 122, one or more processing units 124, and memory 126. The network interface 122 includes, for example, Ethernet adaptors, wireless adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a figure acquisition manager 130; a caption type manager 140; an encoding manager 150 which includes a feature manager 152, an array manager 154, and an attention manager 156; a caption unit manager 170, and a post-editing manager 180. Further, as illustrated in FIG. 1, the memory 126 is configured to store various data, which is described with respect to the respective managers that use such data.

The figure acquisition manager 130 is configured to obtain figure image data 132 representing a figure image and figure image metadata 136 representing information in the figure image not necessarily visible to a reader, such as bounding box coordinates, as well as some information that is visible, such as text labels. In some implementations, the acquisition manager 130 is configured to receive the figure image data 132 and the figure image metadata 136 over a network via the network interface 122. In some implementations, the figure acquisition manager 130 is configured to receive the figure image data 132 and the figure image metadata 136 via local storage (e.g., memory 126).

The figure image data 132 a figure image containing elements such as bars and text labels that are used to communicate a quantitative result to a reader. In some implementations, a figure image takes the form of a bar graph with the bars horizontal or vertical. In some implementations, a figure image takes the form of a line graph. In some implementations, a figure image takes the form of a pie chart. As shown in FIG. 1, the figure image data 132 includes a set of features 134(1), 134(2), . . . , 134(M).

The set of features 134(1), 134(2), . . . , 134(M), where M is a number of feature maps, each represent a graphical aspect of the figure image. In some implementations, the set of features 134(1), 134(2), . . . , 134(M) result from an encoding of the figure image data 132 by, e.g., a neural network such as a convolutional neural network (CNN). Each feature, e.g., feature 134(1), is represented by a quantity $x_{i,j}$, which is a position within an output layer of the encoding CNN. In some implementations, the quantity $x_{i,j}$ may be a vector. The quantity $x_{i,j}$ may be used in subsequent networks to determine several values including attention weights and slot values.

The figure image metadata 136 represents information in the figure image not necessarily visible to a reader, such as bounding box coordinates, as well as some information that is visible, such as text labels. The figure image metadata 136, in some implementations, is provided explicitly and separately from the figure image data 132. In some implementations, however, the figure image metadata 136 is deduced implicitly, e.g., using optical character recognition (OCR), from the figure image data 132. As shown in FIG. 1, the figure image metadata 136 includes a set of bounding box coordinates 138(1), 138(2), . . . , 138(N), where N is the number of elements of the figure image having bounding boxes, and a set of text labels 139(1), 139(2), . . . , 139(N).

The caption type manager 140 is configured to receive caption type data 142, additional input data 144, static dictionary data 146, and dynamic dictionary data 148. In some implementations, the caption type manager 140 is configured to receive the caption type data 142, additional input data 144, static dictionary data 146, and dynamic dictionary data 148 over a network via the network interface 122. In some implementations, the figure acquisition manager 130 is configured to receive the caption type data 142, additional input data 144, static dictionary data 146, and dynamic dictionary data 148 via local storage (e.g., memory 126).

The caption type data 142 represents one of a finite number of caption types from which a caption unit may be generated. Examples of caption types include a title, a figure type, a count, a label name, a minimum or maximum value, a comparison, and a value. In some implementations, the caption type data 142 takes the form of a number that indicates one of the finite number of caption types. In some implementations, the caption type data 142 takes the form of a string.

The additional input data 144 is data specific to a caption type that may be needed for generating the caption unit from that caption type. Some caption types such as "Title" do not require any addition input data 144. In contrast, the caption type "Value" requires an identifier of an element. Further detail concerning the caption type data 142 and the additional type data 144 is discussed with regard to FIG. 3.

The static dictionary data 146 represents a repository of words that are formed from caption datasets that appear in captions but not in metadata. The dynamic dictionary data 148 represents a small amount of reserved word indices to accommodate each bounding box. Accordingly, the same word index may have different associations in different figures.

The encoding manager 150 is configured to produce an encoding of the figure image data 132 and the figure image metadata 136 to produce encoded data 160 used to initialize a decoder and produce caption units. As shown in FIG. 1, the encoding manager 150 includes a feature manager 152, an array manager 154, and an attention manager 156.

The feature manager 152 is configured to extract the set of features 134(1), . . . , 134(M) from the figure image data 132. In some implementations, the feature manager 152 includes a CNN. In some implementations, the CNN is a ResNet-50.

The array manager 154 is configured to generate array data 162 representing metadata information for each element of the figure image. In some implementations, the array data 162 takes the form of an N×6 matrix, where N is number of bounding boxes. Each row is an input sequence of values: four bounding box coordinates (138(1), . . . , 138(N)), a dynamic word index associated with the text label for that bounding box, and a binary bit indicating whether the text label contains only digits. In some implementations, the array data 162 includes further columns corresponding to the features 134(1), . . . ,134(M) extracted by the feature manager 152.

The attention manager 156 is configured to produce attention data 164 for each element based on the array data 162. In some implementations, the attention data further includes weights learned during training of the encoding manager 150. The attention data 164 is analogous to a salience of each figure image element within a respective bounding box.

The encoding manager 150 is further configured to produce slot value data 156 based on the attention data 156 and the features 134(1), . . . , 134(M). The slot value data 156 represents a slot value word used in the initialization of a decoder LSTM that generates a caption unit. Further details of the slot value data are discussed with regard to FIG. 4A.

The caption unit manager 170 is configured to generate caption unit data 172 representing a caption unit, i.e., a sequence of words describing an aspect of the figure image based on the caption type. The caption unit manager 170 accordingly acts as the decoder that has been initialized using the attention data 164 and the slot value data 166.

The caption manager 174 is configured to arrange multiple caption units to form caption data 176 representing a caption describing the figure image over several caption types. In some implementations, the caption manager 174 concatenates the caption units represented by the caption unit data 172 to form the caption data 176.

The post-editing manager 180 is configured to perform a post-editing operation on the caption data 176 to produce the post-edited caption data 182. The post-edited caption data 182 represents the same caption as that in caption data 176 but with a more natural language quality to the caption text, making the caption clearer to the reader. The post-editing manager 180 makes use of both the static dictionary data 146 and the dynamic dictionary data 148. Further detail concerning the post-editing manager 180 is discussed with regard to FIG. 5.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, a figure acquisition manager 130 (and/or a portion thereof), a caption type manager 140 (and/or a portion thereof), an encoding manager 150 including a feature manager 152, an array manager 154, and an attention manager 156 (and/or a portion thereof), a caption unit manager 170 (and/or a portion thereof), a caption manager 174 (and/or a portion thereof), and a post-editing manager 180 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including figure image data 132, figure image metadata 136, caption type data 142, additional input data 144, static dictionary data 146, dynamic dictionary data 148, encoded data 160, caption unit data 172, caption data 176, and post-edited caption data 182.

Figure 2:
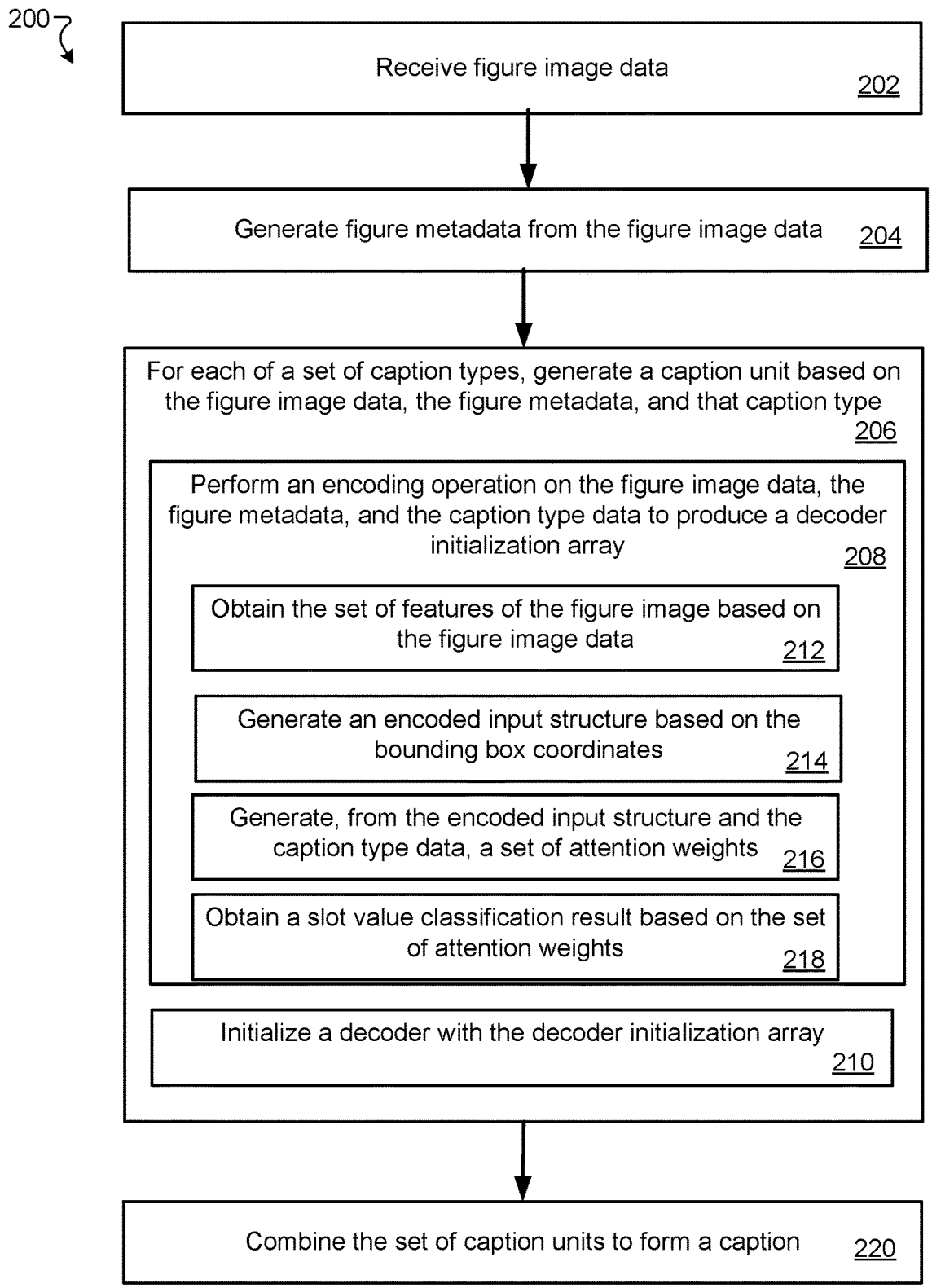
FIG. 2 is a flow chart illustrating an example method of implementing the improved techniques as shown in the electronic environment in FIG. 1.

FIG. 2 is a flow chart depicting an example method 200 of captioning for figures. The method 200 may be performed by software constructs described in connection with FIG. 1, which reside in memory 126 of the computer 120 and are run by the set of processing units 124.

At 202, the figure acquisition manager 130 receives figure image data, the figure image data representing a figure, the figure having a set of components.

At 204, the figure acquisition manager 130 generating figure metadata from the figure image data, the figure metadata including numerical and textual values describing the set of components of the figure.

At 206, the caption unit manager 170, for each of a set of caption types, each of the set of caption types indicating a respective component of the set of components of the figure, generates a caption unit of a set of caption units based on the figure image data, the figure metadata, and that caption type, each of the set of caption units corresponding to a respective component of the set of components and including a sequence of words describing that component.

In some implementations, at 208, the encoding manager 150 performs an encoding operation on the figure image data, the figure metadata, and the caption type data to produce a decoder initialization array, the decoder initialization array including a caption type vector representing the caption type and an embedding of a slot value word. In such an implementation, at 210, the encoding manager initializes a decoder (e.g., the caption unit manager 170) with the decoder initialization array, the decoder being configured to predict the sequence of words of the caption unit.

In some implementations, at 212, the feature manager 152 obtains a set of features of the figure image based on the figure image data, the obtaining being performed via a neural network, each of the set of features having a corresponding bounding box of a set of bounding boxes, the feature metadata including bounding box coordinates of the set of bounding boxes. In such an implementation, at 214, the array manager 154 generates an encoded input structure based on the bounding box coordinates, the encoded input structure including an array of input sequences, each element of the array of input sequences corresponding to a bounding box of the set of bounding boxes. In such an implementation, at 216, the attention manager 156 from the encoded input structure and the caption type, a set of attention weights, each of the set of attention weights corresponding to a bounding box of the set of bounding boxes and representing a likelihood of the bounding box being associated with a slot value word. In such an implementation, at 218, the encoding manager 150 obtains a slot value classification result based on the set of attention weights.

At 220, the caption manager 174 obtains a slot value classification result based on the set of attention weights.

FIG. 3 is a diagram illustrating an example table 300 of a set of caption types, their descriptions, and respective additional inputs. The table 300 shows examples of caption type data 142 and additional input data 144. By defining a fixed number of caption types, the improved techniques described herein allow a user to automatically generate captions using caption units corresponding to each caption type.

The caption types shown in FIG. 3 include "Title," "Figure Type," Count," "Label Name," "Min/Max," "Comparison," and "Value." The caption types used in the improved techniques are not limited to those shown in FIG. 3. Nevertheless, the caption types shown in FIG. 3 have been used to generate figure captions and are discussed in detail herein.

The "Title" caption type refers to a title of the figure, the text of which is included in the figure image metadata 136. In some implementations, the text of the title may be paraphrased. The paraphrasing may be performed according to a rule. Table 300 indicates that the "Title" caption type requires no additional input. An example output caption unit generated from the "Title" caption type is "This table shows sales statistics for items in different stores." The slot value of the caption unit is "sales statistics for items in different stores."

The "Figure Type" caption type refers to whether the figure is a horizontal or vertical bar chart, a pie chart, a line chart, or something else. Table 300 indicates that the "Figure Type" caption type requires no additional input. An example output caption unit generated from the "Title" caption type is "This is a horizontal bar chart." The slot value of the caption unit is "horizontal," although in some implementations, the slot value is "horizontal bar chart."

The "Count" caption type refers to the number of elements in the figure image (e.g., number of bars in a bar chart). Table 300 indicates that the "Count" caption type requires no additional input. An example output caption unit generated from the "Count" caption type is "There are three bars in the chart." The slot value of the caption unit is "three."

The "Label Name" caption type refers to a position of a text label name from an ordered position. Table 300 indicates that the "Label Name" caption type requires one additional input: an ordinal number. An example output caption unit generated from the "Label Name" caption type is "Cage is the label of the first bar from the bottom." The slot value of the caption unit is "Cage," and the additional input is "first."

The "Min/Max" caption type refers to the element in the figure image associated with a minimum or maximum value. Table 300 indicates that the "Min/Max" caption type requires no additional input. An example output caption unit generated from the "Min/Max" caption type is "Frame has the highest accuracy." The slot value of the caption unit is "Frame."

The "Comparison" caption type refers to an advantage of one element over another. Table 300 indicates that the "Comparison" caption type requires two additional inputs: identifiers of two elements of the figure to be compared. An example output caption unit generated from the "Comparison" caption type is "The accuracy of the algorithm damage is larger than ward." The slot value of the caption unit is "larger," and the additional inputs are "damage" and "ward."

The "Value" caption type refers to a value associated with an element. Table 300 indicates that the "Value" caption type requires one additional input: an element identifier. An example output caption unit generated from the "Value" caption type is "80 is the accuracy of the algorithm brace." The slot value of the caption unit is "80," and the additional input is "brace."

Figure 4A:
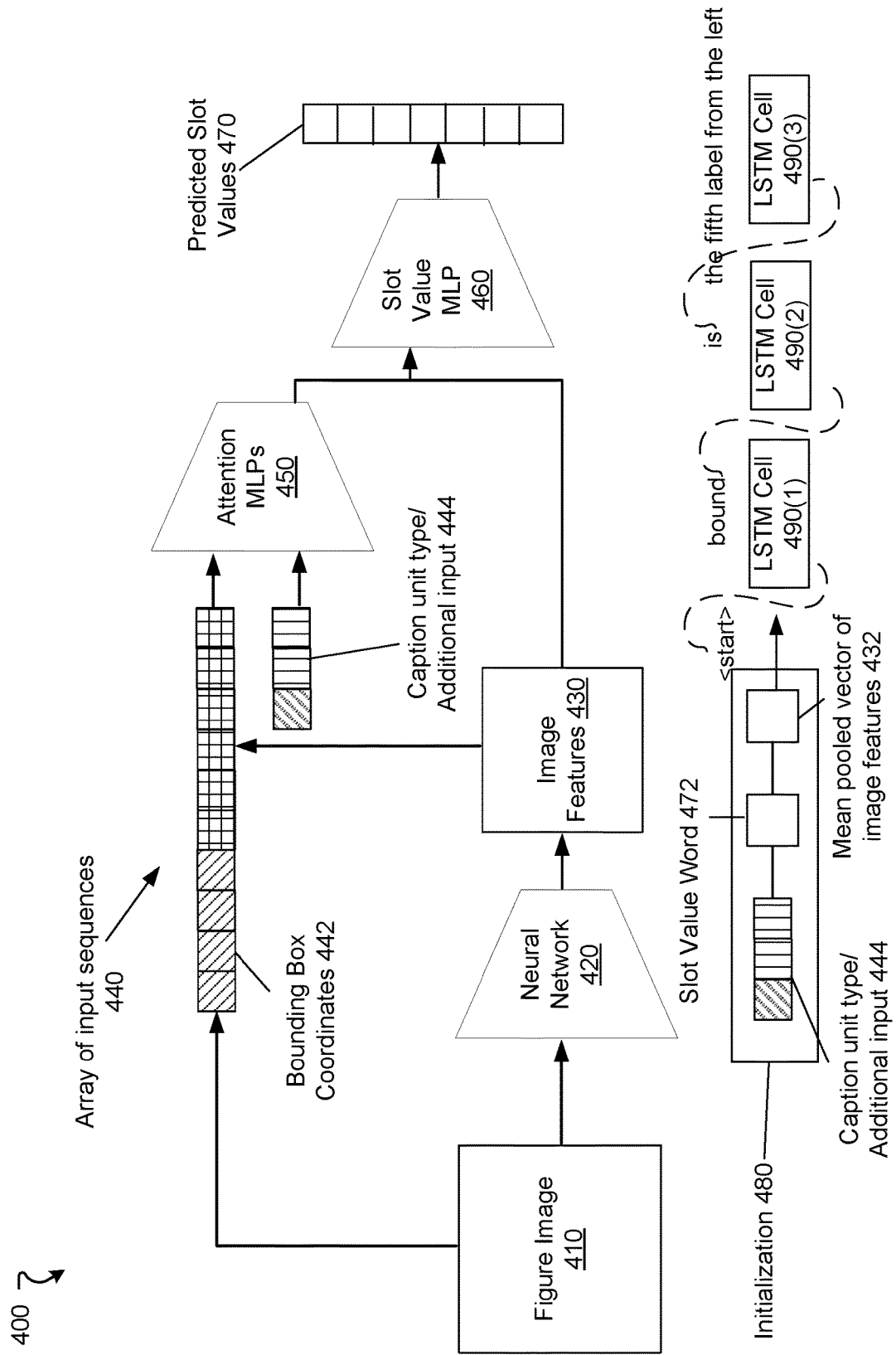
FIG. 4A is a diagram illustrating an example architecture of an automated system for generating caption units.

FIG. 4A is a diagram illustrating an example architecture of an automated system 400 for generating caption units. The automated system 400 takes as input a figure image 410. The figure image 410 is input into a neural network (e.g., a CNN) 420, which output image features 430. The figure image 410 also has metadata that is either explicitly or implicitly provided. The metadata includes bounding box coordinates 442 and text labels. The system 400 generates an array of input sequences 440 including the coordinates 442, a dynamic word index associated with the text label for the bounding box having those coordinates, and a binary bit indicating whether the text label contains only digits; accordingly, the array 400 takes the form of a matrix having a row for each bounding box. In addition, the system 400 also forms an array 444 including an indicator of the caption unit type and the additional input associated with that caption unit type. For each bounding box, the system 400 inputs each row of the array 440 and the array 444 into a series of multi-layer perceptrons (MLPs) 450 to produce attention weights for each row, for the caption type. Accordingly, there are arrays of attention weights for each caption type. The system 400 inputs these arrays and the image features 430 into a slot value MLP 460 to produce predicted slot values 470. The system 400 forms an initialization array 480 for generating a caption unit from the array 444, a slot value word 472, and a mean pooled vector 432 of the image features 430. The system 400 inputs the initialization array 480 into a first long-short-term memory (LSTM) cell 490(1) to produce a first word "bound," which is input into a second LSTM cell 490(2) to produce a second word, and so on until the caption unit is generated.

Figure 4B:
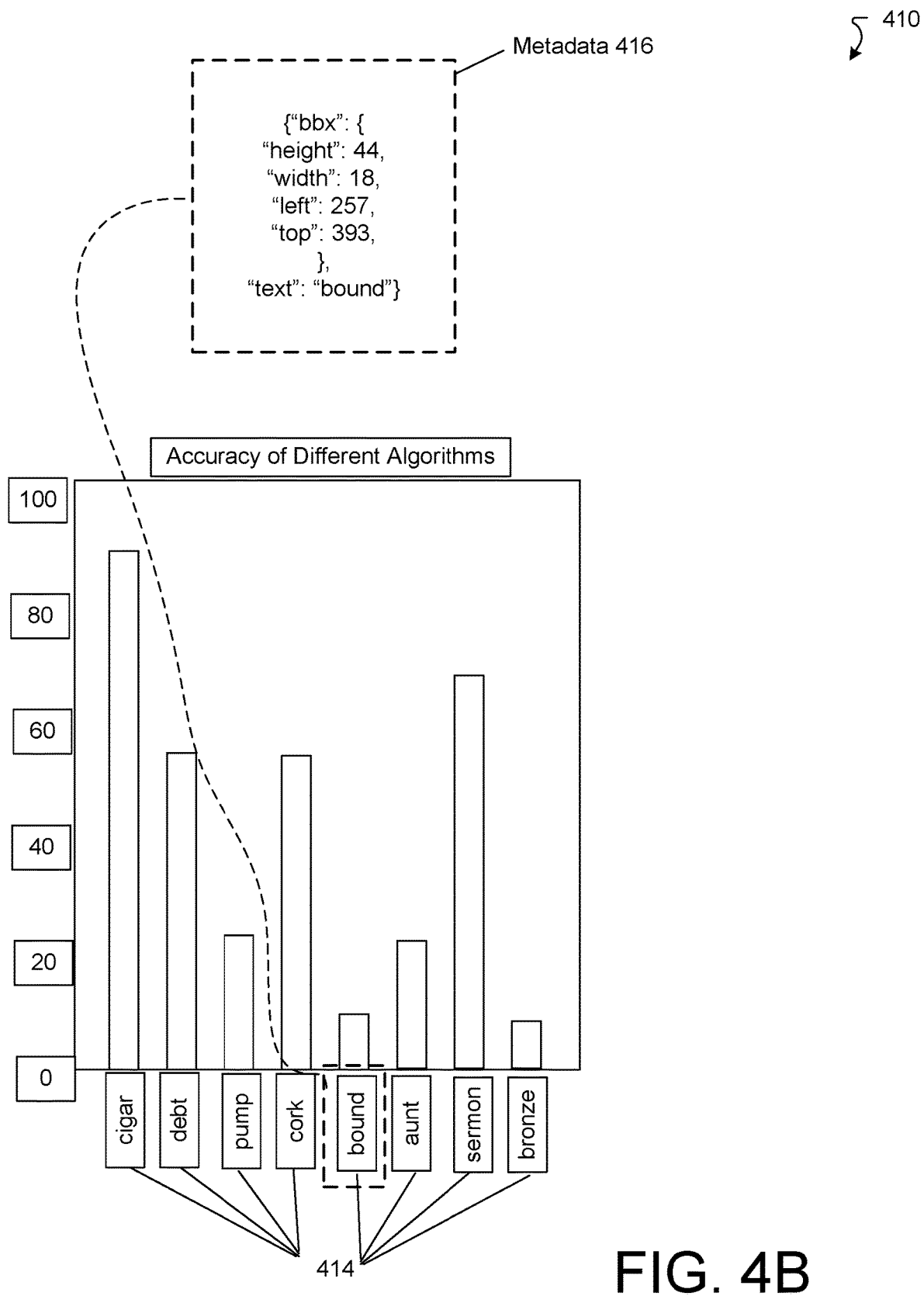
FIG. 4B is a diagram illustrating example figure metadata.

FIG. 4B is a diagram illustrating example details 410 of the figure metadata 416. The figure image 410 is a vertical bar chart. Each bar has a value and a text label. Each value and text label has a bounding box 414 that also has an index in a dynamic dictionary. In FIG. 4B, the text label "bound" has metadata 416. The metadata 416 indicates that the bounding box ("bbx") has a height value 44, a width value 18, a left coordinate 257, and a top coordinate 393. The text label value "bound" is also included in metadata 416.

Returning to FIG. 4A, details of the operations performed by the system 400 are provided herein. The problem solved by the system 400 may be stated formally as follows:

Given an input figure image X, a set of metadata information in tuples of text labels and bounding box coordinates $\{(s_1, c_1), (s_2, c_2), \ldots, (s_n, c_n)\}$, and a caption type i, outputs a sequence of words $y=\{y_1, \ldots, y_l\}$ as the caption unit, where l is the length of the caption. Optionally, specific caption type may require additional input $d=\{d_1, \ldots, d_n\}$ as the guiding signal.

Encoding Input

There are four parts of input to the model: (1) a pixel figure image; (2) a set of OCR-extracted bounding box tuples (the gray doted box); (3) the caption type (the pink vector); (4) the additional input required for the type (the orange vector). These additional input are expressed as word indexes, from either the dynamic or static dictionary. The dynamic dictionary includes 30 reserved word indices to accommodate each bounding box. Therefore, the same word index has different denotations in different figures. CNN (e.g. ResNet-50) encodes the raw figure image to get its features $X=\{x_{1,1}, \ldots x_{H,W}\} \in \mathbb{R}^m$, where H and W are the height and width from CNN output and m is the number of feature maps. This image feature is later used to calculate the joint attention along with bounding box information, and to calculate the adaptive soft attention for each decoding time step.

For the caption type, we encode it as a vector i of length 1. For the additional input associated with a caption type, we represent it as a vector of $d=\{d_1, \ldots, d_n\}$ where n is the maximum number of additional inputs across all types. For caption unit types that do not require additional input, d is a zero-filled vector of the same length. The caption type vector and additional input vector are concatenated as the query vector (red and orange color block) $\hat{d}=[d; i]$.

Given the set of metadata information, we construct a matrix $S \in \mathbb{R}^{n \times 6}$, where n is a figure-specific value denoting the number of bounding boxes within the figure, and 6 is the column dimension consisting of the (1) metadata coordinates; (2) the dynamic word index associated with the text label; (3) a binary bit indicating whether the text label contains only digits.

Attention to Positional Ordering

The "Label Name" type of caption units describes the text label name from a given ordered position. To predict the correct text label for a given position, one shall look at the coordinates of the text label as well as their relative value to the coordinates of other text labels.

Therefore, the first attention that uses the query vector $\hat{d}$ (which contains the ordered position) is calculated to query the bounding box matrix S. Specifically, let $s_i$ be the i-th row in S. The attention weight to this bounding box is calculated as follows. First, the interaction between a bounding box row and the query vector is captured by an MLP.

$$e_i = \text{Attn}(s_i, \hat{d}) = v^T \tanh(Ws_i + U\hat{d}),$$

where v, W, and U are weights determined from training the system 400. Outputs for each bounding box row are aggregated into a matrix, then goes through another fully-connected MLP layer, to sort out a relative ordering of the bounding boxes ("sorting MLP"). The MLP is followed by the soft max function. This gives the final attention weights for each bounding box information.

$$a = [a_0; a_1; \ldots; a_n] = \text{soft max}(\text{MLP}([e_0; e_1; \ldots; e_n]))$$

Attention to Object-Based Value

To predict the correct text label that has the min/max value, one needs to compare values (e.g. bar heights) associated with each text labels. For orthogonal figure types like bar charts, the coordinates of the text label serve as an anchor to know the location of its element (e.g. bars) in the figure.

Therefore, we augment the bounding box matrix S into $\hat{S}$. For each row in S that corresponds to one bounding box text label, we append it with feature vectors from the image feature that come from the same row and the same column as its coordinate. These augmented features can be viewed as local hard attention to the figure, guided by object-specific information.

Suppose $s_i$ is the i-th metadata rows in S. It has the coordinate of (l, t, w, h) where l is its distance to the left margin and t is its position to the top, while the figure has width W and height H. The row index of the bounding box is $$r_i = \frac{r+h}{2}$$

while the column index is $$c_i = \frac{l+w}{2}.$$

The augmented vector for the bounding box then becomes $$\hat{s}_i = [s_i; (x_{r_i,1}, \ldots, x_{r_i,W}); (x_{1,c_i}, \ldots, x_{H,c_i})].$$

Similar to the first attention, the attention weights for each bounding box information is calculated as $$\hat{e}_i = \text{Attn}(\hat{s}_i, d) = v^T \tanh(W\hat{s}_i + U\hat{d}),$$

$$\hat{a} = [\widehat{a_0}; \widehat{a_1}; \ldots ; \widehat{a_n}] = \text{soft max}(\text{MLP}([\widehat{e_0}; \widehat{e_1}; \ldots ; \widehat{e_n}])).$$

Relation Classification on Object-Based Value Pairs

The "Comparison" type describes the comparative advantage of one element over the other. Inspired by a relation network that models relations between object descriptor boxes on the a known dataset, a classification component is introduced that focuses on the relations between figure elements, through metadata information. The query vector $\hat{d}$ containing two objects to be compared, are used to retrieve two rows from $\hat{S}$, namely $\hat{s}_i$ and $\hat{s}_j$.

$$\tilde{a} = \text{MLP}(\hat{s}_i - \hat{s}_j).$$

This relation modeling is different from previous work on figure question answering. The latter models pixel-level pairwise relation, which is argued that pixel-level granularity is both too fine and inefficient to fit the goal of object-wise comparison.

Auxiliary Slot Value Classification

The image feature, attentions and relation classification results are aggregated and passed through an auxiliary classification module. The module predicts a dictionary word among the static and dynamic dictionary as the slot value word w before generating the caption. The classifier is implemented as an MLP whose output class size as the joint dictionary size.

$$w = \text{MLP}([a; \hat{a}; \tilde{a}; \overline{X}])$$

Initializing the Decoder LSTM

After getting the slot value classification result, four sources of information are concatenated as a joint vector: (1) the mean pooled vector of image feature x; (2) the caption unit type vector i; (3) the embedding of additional inputs d; (4) the embedding of slot value word w. This vector is used to initialize the decoder LSTM. At each step, the decoder LSTM predicts with attention weighted image feature and the word embedding of last predicted word.

FIG. 5 is a diagram illustrating example post-editing rules 500. The rules 500 are regex substitutions. FIG. 5 lists four example rules. Each rule is a pair of one source pattern and at least one target pattern. Some rules have two target patterns to simulate two options to post-edit, one option is a primary post-editing pattern with a probability of 0.8 and another is a secondary pattern with a probability of 0.2. The two options can be viewed as scenarios where two writing styles co-exist in a training corpus, e.g. general vs. context-specific, formal vs. informal, etc.

To convert each unedited caption unit, all source patterns are enumerated, when a source pattern matches with the caption unit, its target pattern, or one of its target patterns selected by a random chance of p=[0.8, 0.2], is applied to the caption unit. This process provides post-edited ground truth caption units.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving figure image data, the figure image data representing a figure, the figure having a set of components;
generating figure metadata from the figure image data, the figure metadata including numerical and textual values describing the set of components of the figure;
for each of a set of caption types, each of the set of caption types indicating a respective component of the set of components of the figure, computing a corresponding caption type vector representing the caption type and an embedding of a slot value word associated with the caption type;
for each of the set of caption types, generating a caption unit of a set of caption units based on the figure image data, the figure metadata, the corresponding caption type vector and the embedding of the slot value word, each of the set of caption units corresponding to a respective component of the set of components and including a sequence of words describing that component; and
combining the set of caption units to form a caption associated with the figure.

2. The method as in claim 1, wherein generating the caption unit includes:
performing an encoding operation on the figure image data, the figure metadata, and the caption type to produce a decoder initialization array, the decoder initialization array including the corresponding caption type vector representing the caption type and the embedding of the slot value word; and
initializing a decoder with the decoder initialization array, the decoder being configured to predict the sequence of words of the caption unit.

3. The method as in claim 2, wherein performing the encoding operation includes:
obtaining a set of features of the figure image based on the figure image data, the obtaining being performed via a neural network, each of the set of features having a corresponding bounding box of a set of bounding boxes, the figure metadata including bounding box coordinates of the set of bounding boxes;
generating an encoded input structure based on the bounding box coordinates, the encoded input structure including an array of input sequences, each element of the array of input sequences corresponding to a bounding box of the set of bounding boxes;
generating, from the encoded input structure and the caption type, a set of attention weights, each of the set of attention weights corresponding to a bounding box of the set of bounding boxes and representing a likelihood of the bounding box being associated with the slot value word; and
obtaining a slot value classification result based on the set of attention weights.

4. The method as in claim 3, wherein a caption type of the set of caption types indicates that the caption type is a label name describing a name of a text label corresponding to a bounding box of the set of bounding boxes and its position relative to a fixed location, and
wherein generating the set of attention weights includes:
forming a query vector based on the position of the text labels corresponding to each of the set of bounding boxes;
for each of the set of bounding boxes, generating a raw weight based on the array of input sequences corresponding to that bounding box and the query vector to produce a set of raw weights; and
performing a normalization operation on the set of raw weights to produce the set of attention weights, a sum of the attention weights of the set of attention weights being unity.

5. The method as in claim 4, wherein generating the raw weight for each of the set of bounding boxes includes:
multiplying the array of input sequences corresponding to that bounding box by a first fixed array to produce a first vector;
multiplying the query vector by a second fixed array to produce a second vector; and
applying a sigmoidal function to a sum of the first vector and the second vector.

6. The method as in claim 3, wherein the figure metadata further includes a set of text labels, each of the set of text labels corresponding to a respective bounding box, and
wherein each array of input sequences of the encoded input structure corresponding to a respective bounding box of the set of bounding boxes includes the bounding box coordinates of the bounding box, an index indicative of the text label corresponding to the bounding box, and a binary value indicating whether the text label corresponding to the bounding box has digits only.

7. The method as in claim 6, wherein a caption type of the set of caption types indicates that the caption type describes an element of the figure that has a minimum or maximum value, and
wherein generating the set of attention weights includes:
forming a query vector based on a position of the text labels corresponding to each of the set of bounding boxes;
for each of the set of bounding boxes:
appending the array of input sequences corresponding to that bounding box with features of the figure that are in the same row and column as that indicated by the coordinates of that bounding box to produce an augmented array of input sequences;
generating a raw weight based on the augmented array of input sequences corresponding to that bounding box and the query vector to produce a set of raw weights; and
performing a normalization operation on the set of raw weights to produce the set of attention weights, a sum of the attention weights of the set of attention weights being unity.

8. The method as in claim 3, wherein a caption type of the set of caption types indicates that the caption type describes a comparison between a first element of the figure and a second element of the figure, and
wherein generating the set of attention weights includes:
forming a query vector based on the first element and the second element; and
performing a relation classification operation on a difference between the array of input sequences corresponding to that bounding box for the first element and the array of input sequences corresponding to that bounding box for the second element to produce an attention weight.

9. The method as in claim 3, wherein obtaining the slot value classification result based on the set of attention weights includes:
performing a classification operation on the set of attention weights and the set of features of figure image to produce the slot value word, the classification operation being configured to predict, as the slot value word, a dictionary word among a static dictionary and a dynamic dictionary, the slot value word being used to initialize the decoder.

10. The method as in claim 1, further comprising:
generating rules for a post-editing operation configured to produce a natural language caption unit from the caption unit; and
performing the post-editing operation on the caption associated with the figure by applying the generated rules to produce the natural language caption unit.

11. A computer program product including a non-transitory computer-readable storage medium and storing executable code that, when executed by at least one data processing apparatus, is configured to cause the at least one data processing apparatus to perform a method, the method comprising:
receiving figure image data, the figure image data representing a figure, the figure having a set of components;
generating figure metadata from the figure image data, the figure metadata including numerical and textual values describing the set of components of the figure;
for each of a set of caption types, each of the set of caption types indicating a respective component of the set of components of the figure, computing a corresponding caption type vector representing the caption type and an embedding of a slot value word associated with the caption type;
for each of the set of caption types, generating a caption unit of a set of caption units based on the figure image data, the figure metadata, the corresponding caption type vector and the embedding of the slot value word, each of the set of caption units corresponding to a respective component of the set of components and including a sequence of words describing that component; and
combining the set of caption units to form a caption associated with the figure.

12. The computer program product as in claim 11, wherein generating the caption unit includes:
performing an encoding operation on the figure image data, the figure metadata, and the caption type to produce a decoder initialization array, the decoder initialization array including the corresponding caption type vector representing the caption type and the embedding of the slot value word; and
initializing a decoder with the decoder initialization array, the decoder being configured to predict the sequence of words of the caption unit.

13. The computer program product as in claim 12, wherein performing the encoding operation includes:
obtaining a set of features of the figure image based on the figure image data, the obtaining being performed via a neural network, each of the set of features having a corresponding bounding box of a set of bounding boxes, the figure metadata including bounding box coordinates of the set of bounding boxes;
generating an encoded input structure based on the bounding box coordinates, the encoded input structure including an array of input sequences, each element of the array of input sequences corresponding to a bounding box of the set of bounding boxes;
generating, from the encoded input structure and the caption type, a set of attention weights, each of the set of attention weights corresponding to a bounding box of the set of bounding boxes and representing a likelihood of the bounding box being associated with the slot value word; and
obtaining a slot value classification result based on the set of attention weights.

14. The computer program product as in claim 13, wherein a caption type of the set of caption types indicates that the caption type is a label name describing a name of a text label corresponding to a bounding box of the set of bounding boxes and its position relative to a fixed location, and
wherein generating the set of attention weights includes:
forming a query vector based on the position of the text labels corresponding to each of the set of bounding boxes;
for each of the set of bounding boxes, generating a raw weight based on the array of input sequences corresponding to that bounding box and the query vector to produce a set of raw weights; and
performing a normalization operation on the set of raw weights to produce the set of attention weights, a sum of the attention weights of the set of attention weights being unity.

15. The computer program product as in claim 13, wherein the metadata further includes a set of text labels, each of the set of text labels corresponding to a respective bounding box, and
wherein each array of input sequences of the encoded input structure corresponding to a respective bounding box of the set of bounding boxes includes the bounding box coordinates of the bounding box, an index indicative of the text label corresponding to the bounding box, and a binary value indicating whether the text label corresponding to the bounding box has digits only.

16. The computer program product as in claim 15, wherein a caption type of the set of caption types indicates that the caption type describes an element of the figure that has a minimum or maximum value, and
wherein generating the set of attention weights includes:
forming a query vector based on the position of the text labels corresponding to each of the set of bounding boxes;
for each of the set of bounding boxes:
appending the array of input sequences corresponding to that bounding box with features of the figure that are in the same row and column as that indicated by the coordinates of that bounding box to produce an augmented array of input sequences;
generating a raw weight based on the augmented array of input sequences corresponding to that bounding box and the query vector to produce a set of raw weights; and
performing a normalization operation on the set of raw weights to produce the set of attention weights, a sum of the attention weights of the set of attention weights being unity.

17. The computer program product as in claim 13, wherein a caption type of the set of caption types indicates that the caption type describes a comparison between a first element of the figure and a second element of the figure, and
wherein generating the set of attention weights includes:
forming a query vector based on the first element and the second element; and
performing a relation classification operation on a difference between the array of input sequences corresponding to that bounding box for the first element and the array of input sequences corresponding to that bounding box for the second element to produce an attention weight.

18. The computer program product as in claim 13, wherein obtaining the slot value classification result based on the set of attention weights includes:
    performing a classification operation on the set of attention weights and the figure image features to produce the slot value word, the classification operation being configured to predict, as the slot value word, a dictionary word among a static dictionary and a dynamic dictionary, the slot value word being used to initialize the decoder.

19. The computer program product as in claim 11, further comprising:
    generating rules for a post-editing operation configured to produce a natural language caption unit from the caption unit; and
    performing the post-editing operation on the caption associated with the figure by applying the generated rules to produce the natural language caption unit.

20. An apparatus comprising:
    at least one memory including instructions; and
    at least one processor that is operably coupled to the at least one memory and that is arranged and configured to execute instructions that, when executed, cause the at least one processor to:
        receive figure image data, the figure image data representing a figure, the figure having a set of components;
        generate figure metadata from the figure image data, the figure metadata including numerical and textual values describing the set of components of the figure;
        for each of a set of caption types, each of the set of caption types indicating a respective component of the set of components of the figure, computing a corresponding caption type vector representing the caption type and an embedding of a slot value word associated with the caption type;
        for each of the set of caption types, generate a caption unit of a set of caption units based on the figure image data, the figure metadata, the corresponding caption type vector and the embedding of the slot value word, each of the set of caption units corresponding to a respective component of the set of components and including a sequence of words describing that component; and
        combine the set of caption units to form a caption associated with the figure.

* * * * *